United States Patent [19]

Walsh

[11] Patent Number: 5,726,775
[45] Date of Patent: Mar. 10, 1998

[54] METHOD AND APPARATUS FOR DETERMINING A PROFILE OF AN IMAGE DISPLACED A DISTANCE FROM A PLATEN

[75] Inventor: John F. Walsh, Rochester, N.Y.

[73] Assignee: Xerox Corporation, Stamford, Conn.

[21] Appl. No.: 670,954

[22] Filed: Jun. 26, 1996

[51] Int. Cl.[6] .................................................. H04N 1/04
[52] U.S. Cl. ...................... 358/488; 358/480; 358/497; 355/25
[58] Field of Search ................................. 358/488, 486, 358/494, 497, 480, 474, 475, 505, 406, 504, 509; 355/25; 399/362; 250/235–236, 208.1

[56] References Cited

U.S. PATENT DOCUMENTS

| | | | |
|---|---|---|---|
| 4,262,197 | 4/1981 | Nagoh | 358/494 |
| 4,875,104 | 10/1989 | Kamon | 358/474 |
| 4,980,720 | 12/1990 | Siegel | 399/25 |
| 5,017,989 | 5/1991 | Street et al. | 257/291 |
| 5,084,611 | 1/1992 | Okisu et al. | 250/208.1 |
| 5,119,206 | 6/1992 | Rourke et al. | 358/296 |
| 5,184,733 | 2/1993 | Arnarson et al. | 209/585 |
| 5,212,568 | 5/1993 | Graves et al. | 358/474 |
| 5,221,974 | 6/1993 | Kunsumoto et al. | 358/471 |
| 5,276,530 | 1/1994 | Siegel | 358/406 |
| 5,359,207 | 10/1994 | Turner | 257/81 |
| 5,377,019 | 12/1994 | Okisu et al. | 358/464 |
| 5,402,224 | 3/1995 | Hirukawa et al. | 355/53 |
| 5,416,609 | 5/1995 | Matsuda et al. | 358/474 |
| 5,489,993 | 2/1996 | Ito et al. | 358/474 |
| 5,585,926 | 12/1996 | Fujii et al. | 358/471 |

FOREIGN PATENT DOCUMENTS 3546404  7/1993  Germany .............. G02B 27/02

OTHER PUBLICATIONS

U.S. Patent Application No. 08,570,880 entitled "Bound Document Imager with Page Turner" to Turner et al., filed Dec. 12, 1995.

U.S. Patent Application No. 08/570,791 entitled "Bound Document Imager with Air Jet Page Turning system" to Turner et al., filed on Dec. 12, 1995.

Petersson et al., "Position Sensitive Light Detectors with High Linearity," IEEE Journal of Solid–State Circuits, vol., SC–13, No. 3, Jun. 1978.

Primary Examiner—Edward L. Coles, Sr.
Assistant Examiner—Fan Lee
Attorney, Agent, or Firm—Thomas B. Zell

[57] ABSTRACT

A profile detector in a scanning system measures spacing of an original non-planar image from a reference image plane of the scanning system. The spacing is measured by projecting a spot of light, with a collimated light source, onto a scan line of the original non-planar image at an angle that is oblique with respect to the fast scan direction of the scanning system. A first photosensor converts optical information reflecting off of the original non-planar image at a first slow scan position into electrical profile data. A position along the fast scan direction is identified for the first slow scan position by locating the spot of light in the electrical profile data. The located position is compared with a pre-recorded position along the fast scan direction for the first slow scan position. The pre-recorded position defines a position where the first photosensor would have detected the spot of light if it reflected off of a planar image. The difference between the located position and the pre-recorded position is used to determine the value for the spacing between the original non-planar image and the reference image plane at the first slow scan position. In a one pass scanning system, a second photosensor records image data at a second slow scan position that is offset from the first slow scan position. The offset provides sufficient time for the scanning system to calculate the spacing of the original non-planar image from the reference image plane before the second photosensor records image data at the first slow scan position. In a two-pass scanning system, the first photosensor records the image data during the second pass. The scanning system compensates for image distortion caused by the calculated spacing by either adjusting system scan parameters or by performing image processing techniques.

23 Claims, 11 Drawing Sheets

METHOD AND APPARATUS FOR DETERMINING A PROFILE OF AN IMAGE DISPLACED A DISTANCE FROM A PLATEN

The present invention relates generally to a system for scanning bound documents, and more particularly to a method and apparatus for determining a displacement of an original non-planar image from an image plane of a scanning system.

BACKGROUND OF THE INVENTION

Book scanners are becoming more prevalent given the advent of inexpensive digital storage and the ease with which digital information can be disseminated and reproduced. Recording bound documents in a digital format has become an important manner in which to preserve information in ancient books, periodicals, manuscripts, or any other document having a bound edge with a hard or soft cover. Institutions such as the Library of Congress, the Vatican library, and university libraries seek to scan large numbers of volumes of books, both to create digital libraries capable of feeding the information superhighway and to halt the rapid decay of information stored in older printed works. Once content of a page of a bound document is scanned and electronically recorded, the recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted and supplemented with additional information and reproduced on demand as hardcopy using an electronic printing machine or the like.

Different arrangements exist for scanning bound documents. Most arrangements are traditional flat-bed platen scanners that scan bound documents in a face-down position. A disadvantage of flat-bed scanning arrangements is that they require the application of a force to the spine region of a bound document to insure that the bound document comes within a scanner's depth of focus. In addition, image quality is often poor due to loss of focus, uneven illumination, and distortion caused by curvature of a page in the vicinity of the binding. U.S. Pat. Nos. 4,980,720 and 5,276,530 to Siegel disclose an improved arrangement that minimizes the application of force to the spine region of a bound document and improves the image quality of scanned images. Specifically, Siegel discloses a flat-bed scanner with a book mode that minimizes the force typically applied to the spine region of a bound document. In the book scan mode, a page height detector mounted on a scan carriage accounts for the deviation of a book page from the horizontal platen plane in the vicinity of a book's binding. In addition, electronic correction of the captured image is used to compensate for loss of focus, image compression, and uneven illumination. Besides electronic correction, the quality of captured images is maximized by modifying mechanical parameters such as scan rate, and local light source intensity.

Other face-down scanning arrangements minimize the stress on the spine region of bound documents by forming a wedge or an angled platen. Examples of wedge platens for scanning bound documents include, U.S. Pat. No. 5,359,207 to Turner and German Patent DE-A1 3546404. Turner discloses a book scanner with contact imaging that employs two-dimensional sensor arrays that are attached at a common edge and disposed in a wedge shaped manner. German Patent DE-A1 3546404 discloses a roof-shaped book support apparatus for use in a copier application. The optics of the roof-shaped copier arrangement provide that opposing pages of a bound book are simultaneously imaged in the same image plane.

In alternate arrangements, platenless scanners capture image data with a document in a face-up position. Such arrangements do not require additional stress to be applied the binding region of a document when scanned since the document is scanned in its natural open condition. For example, platenless scanners that record a bound document opened face-up from above are disclosed in U.S. Pat. Nos.: 5,084,611; 5,377,019; and 5,416,609. Specifically, U.S. Pat. No. 5,084,611 discloses a document reading apparatus which is disposed above a document table. Curves of the bound document are detected using a curvature detector which includes a linear light source. In addition, the linear light source defines a brightness distribution which is used to rectify image signals received from the document reading means. U.S. Pat. No. 5,377,019 discloses a reading apparatus which can determine an effective image pickup area containing objects such as an operator's hand. U.S. Pat. No. 5,416,609 discloses an image pickup apparatus with a focus adjusting means for controlling an imaging optical system so that an image is in focus on a line sensor during scanning.

In order to facilitate the copying or reproduction of bound documents a plurality of automatic page turning apparatuses have been developed. Such page turning apparatuses minimize the amount of manual effort required to electronically capture the contents of a bound document, as disclosed for example in U.S. patent application Ser. No. 8/570,880 entitled "Bound Document Imager with Page Turner" to Turner et al., filed on Dec. 12, 1995 and assigned to the same assignee as the present invention, and U.S. patent application Ser. No. 08/570,791 entitled "Bound Document Imager with Air Jet Page Turning System" to Turner et al., filed on Dec. 12, 1995 and assigned to the same assignee as the present invention. Further advances have been made to electronic publishing systems to offer job programming of books on a flat bed scanning system. For example, U.S. Pat. No. 5,119,206 to Rourke et al. discloses a system that can be programmed to scan either a selected side or both sides of the bound document. Also, U.S. Pat. No. 5,212,568 to Graves et al. discloses an electronic reprographic apparatus for selectively controlling the areas of the document to be imaged.

Most scanning systems require two passes to correct distortions caused by scanning an original image or bound document having a non-planar surface displaced a distance from an image plane. Typically, a height profile of the bound document, which defines the height or distance open pages of the bound document are spaced from the image plane of the scanning system, is determined during the first scan pass (i.e. a prescan mode). This measured height profile, which changes as pages are turned from one end of the document to the other, represents the contour of the open pages in two or three dimensions. A two-dimensional profile is developed by measuring changes in height between an open page and the image plane of the scanning system along its slow scan direction. A three-dimensional profile is developed by interpolating height measurements between a plurality of two-dimensional height profile measurements at different locations along a scanning system's fast scan direction. During the second pass (i.e. scan mode) the scanning system records image data of the open page. Image distortions due to the contour of the open page are corrected using the two or three-dimensional height profile "map". Factors that account for image distortion include magnification and spacing.

A disadvantage of performing two passes to correct distortions of scanned non-planar original images is the additional process time required to accomplish the first pre-scan pass. Improved performance is achieved by combining the pre-scan pass with the scan pass. In contrast, a one pass scanning system corrects distortions caused when a page of a bound document is displaced from an image plane by determining a height profile of the bound document while simultaneously recording image data. U.S. Pat. Nos. 4,980,720 and 5,276,530 to Siegel suggest that a height profile can be obtained "on the fly", during the first pass by positioning a height detector sufficiently far enough in front of a scanning station to provide sufficient time for the height profile of a page to be processed. The height profile detector disclosed by Siegel uses a distance measurement detector such as an auto focus sensor that is used in cameras. Auto focus sensors measure distance by detecting how long it takes emitted light to reflect off an object. Small changes in distance, however, are difficult to accurately measure with an auto focus system since such distance measurements are a function of time (i.e. the shorter the response, the smaller the distance).

In order to correct image distortion caused when an original image is displaced a distance from the image plane in one-pass or two-pass scanning systems, accurate height profile measurements must be performed by a height profile detector. It would, therefore, be desirable to provide a height profile detector which can accurately measure the small displacements of non-planar portions of a page from the image plane of a scanning system. In addition, it would be advantageous for such a system to operate in either a one-pass or a two-pass scanning system.

SUMMARY OF THE INVENTION

In accordance with one aspect of the invention, there is provided a method for determining a displacement of an original non-planar image from a reference image plane of a scanning system having a fast scan and a slow scan direction. The method includes the steps of projecting a spot of light at an oblique angle onto a scan line of the original non-planar image, the scan line being aligned along the fast scan direction and having a location along the slow scan direction; recording optical information reflected from the scan line to provide profile data for the scan line; evaluating the profile data to identify a first position where the spot of light is located along the fast scan direction in the reference image plane; identifying a second position representing where the spot of light intersects the reference image plane along the fast scan direction; and calculating the difference between the first position and the second position to determine the displacement of the original non-planar image from the reference image plane of the scanning system at the location along the slow scan direction.

In accordance with another aspect of the invention, there is provided an apparatus for determining a displacement of an original non-planar image from an reference image plane of a scanning system. A first light source projects a spot of light at an oblique angle onto the original non-planar image. A fast photosensor records optical information reflected from a scan line of the original non-planar image along a fast scan direction to provide profile data of a scan line at a location along a slow scan direction of the scanning system. Means evaluate the profile data to identify a first position where the spot of light is located along the fast scan direction in the reference image plane. Means identify a second position representing where the spot of light intersects the reference image plane along the fast scan direction. An electronic subsystem calculates the difference between the first position and the second position to determine the displacement of the original non-planar image from the reference image plane of the scanning system at the location along the slow scan direction.

In accordance with yet another aspect of the invention, there is provided an apparatus for scanning an original image displaced a distance from an reference image plane. A first light source illuminates the original image along a fast scan direction. A first sensor records image data illuminated by said first light source. A second light source directs a collimated beam at a location along the fast scan direction. A drive assembly moves the location of the collimated beam in a slow scan direction perpendicular to the fast scan direction. A second sensor converts light reflected off a scan line of the original image to electrical profile data. An electronic subsystem determines the distance the original image is displaced from the reference image plane with the profile data so that distortions in the image data can be corrected.

BRIEF DESCRIPTION OF THE DRAWINGS

These and other aspects of the invention will become apparent from the following description which illustrates preferred and alternative embodiments of the invention read in conjunction with the accompanying drawings wherein the same reference numerals have been applied to like parts and in which.

DETAILED DESCRIPTION

Figure 1:
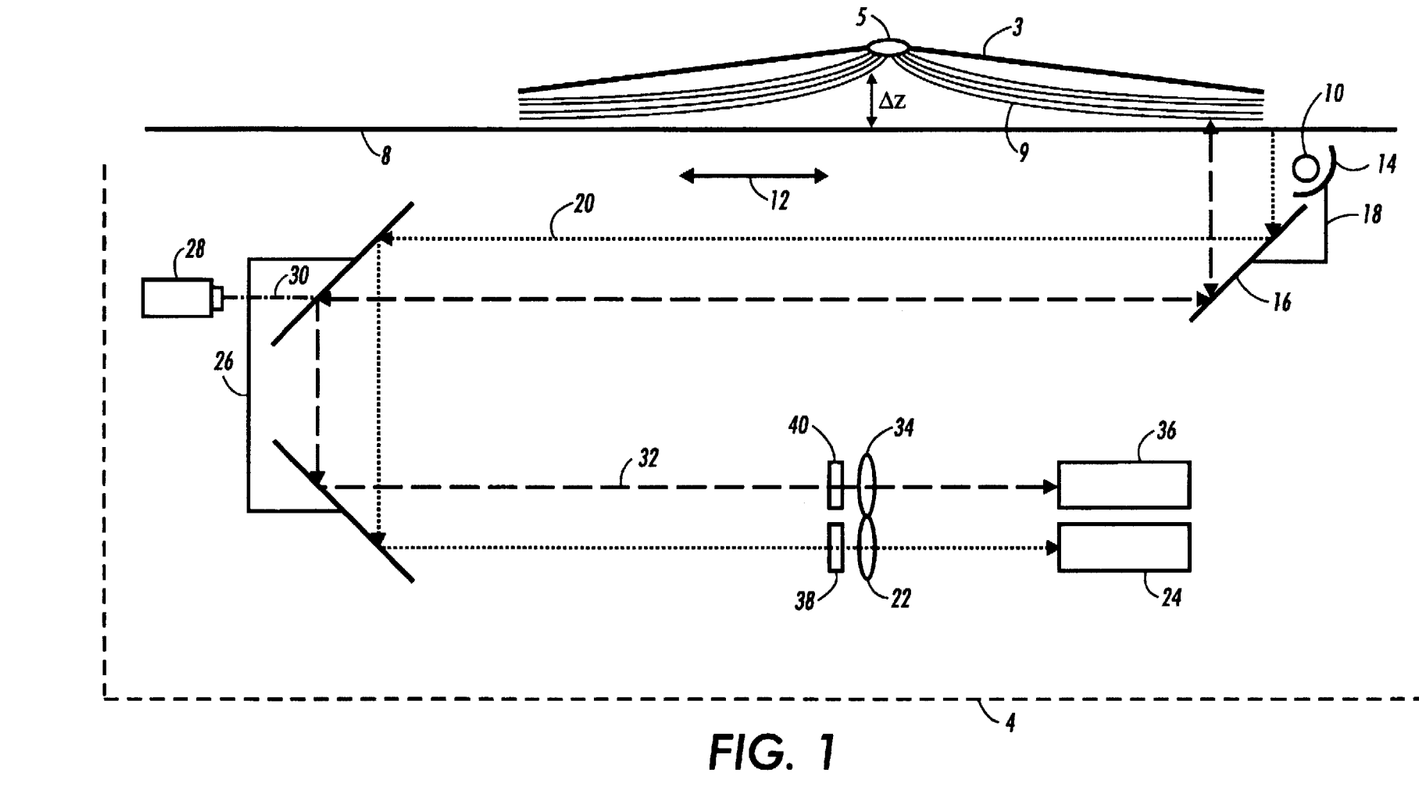
FIG. 1 is a side view of a full rate/half rate scanning system incorporating the present invention.
Figure 2:
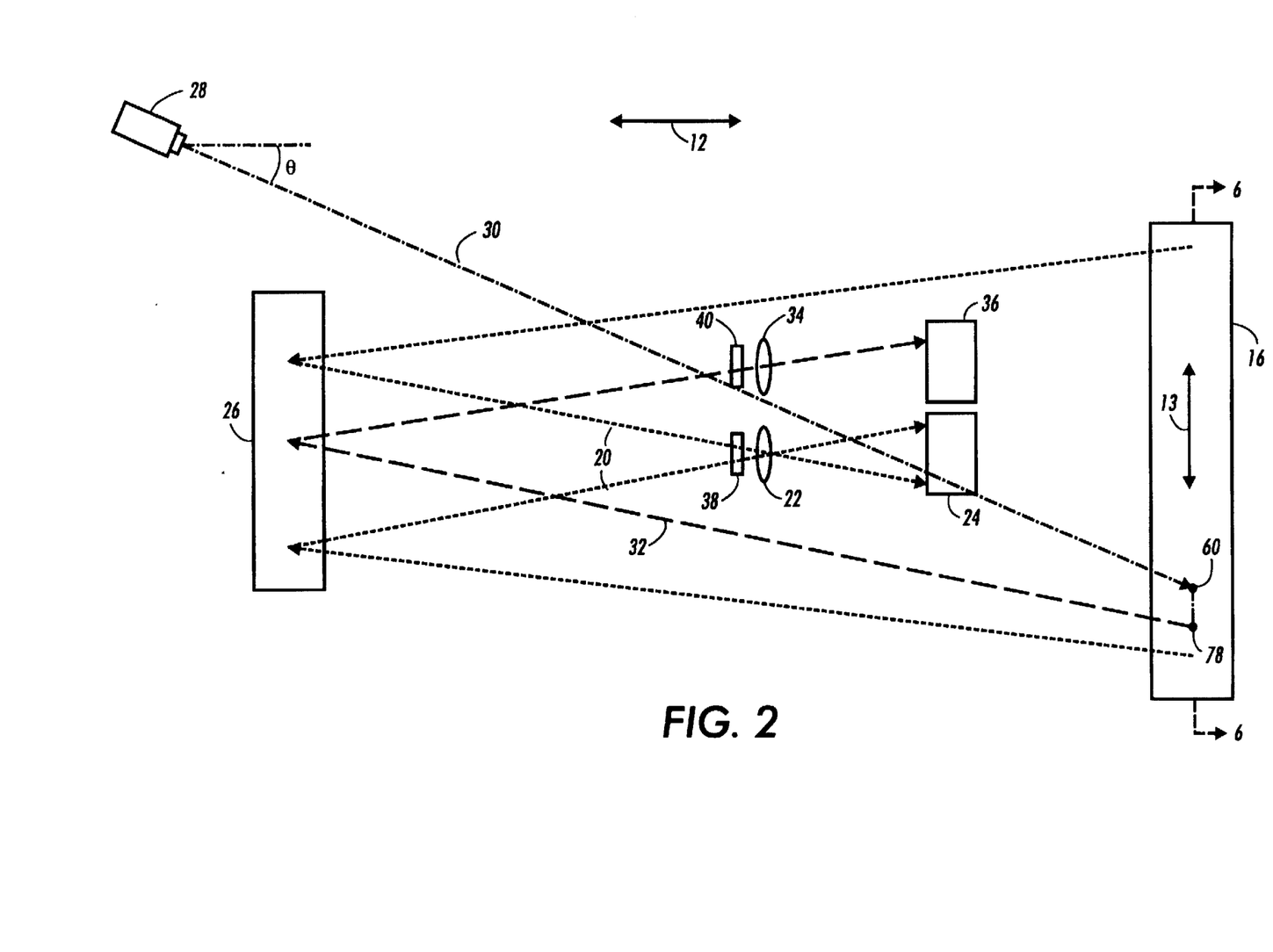
FIG. 2 is a top view of the scanning system shown in FIG. 1.

Referring now to the drawings where the showings are for the purpose of describing the preferred embodiment of the invention and not for limiting same. FIGS. 1 and 2 show a scanning system 4 incorporating the present invention which operates either in a conventional sheet document mode or in a bound document mode. FIG. 1 is a side view, and FIG. 2 is a top view of scanning system 4. The scanning system 4 is positioned under a transparent image platen 8. A bound document 3 with a spine 5 is shown in an open and downwardly facing condition on the upper surface of platen 8. As will become apparent, it is not necessary to force the bound document 3 into a flattened condition against the platen 8 while scanning in the bound document mode. The scanning system 4 includes a light source 10 that illuminates bound document 6. Light is directed at bound document 3 by light source 10 via reflector 14. A full rate/half rate scanning system, which includes a full rate mirror 16 and a half rate mirror assembly 26, directs light diffusely reflected (i.e. optical image information) from sheet or exposed page 9 of bound document 3 along a path indicated generally by reference numeral 20. Focal Optics 22 focuses the optical image information onto a photosensor 24 which converts the optical image information into electrical image data. The photosensor 24 can be a charged couple device (CCD) or any suitable alternative photosensor. The light source 10, reflector 14, and the full rate scanning mirror 16 are mounted on a common drive assembly 18 that moves in a slow scan direction, indicated generally by arrow 12. The drive assembly 18 is adapted to move from right to left beneath the platen 8 at the full rate scan speed. The half rate or corner mirror assembly 26, which is also driven in the slow scan direction 12 from right to left, operates at one-half of the full rate scan speed of common drive assembly 18 to maintain a constant system conjugate.

When operating in conventional sheet document mode, a collimated light source, 28 is turned off and only optical image information is recorded using photosensor 24. However, when operating in the bound document mode, the scanning system 4 illuminates an area (or spot) on the page 9 of bound document 3 with a collimated light source 28 in order to determine profile data of the page 9. The collimated light source can be any collimator capable of focusing light. It will be understood, however, by those skilled in the art that the collimated light source 28 could additionally be a coherent light source such as a laser. In accordance with the present invention, the page height or profile data of the bound document 3, which defines the displacement of an original image from a reference image plane of scanning system 4, is measured by determining a relative distance between the illuminated spot and a pre-recorded spot. The pre-recorded spot is determined by measuring profile data for a planar original image. When recording profile data for either a non-planar image or a planar image, the spot of light projected by the collimated light source 28 traverses the fast scan direction 13 (note FIGS. 2 and 4) as the drive assembly 18 moves in the slow scan direction 12. The light source 28 projects the collimated beam 30 at an angle θ that is not equal to zero (e.g. 20 degrees) relative to the slow scan direction 12. Full rate mirror 16 directs the beam 30 upward from the point indicated generally by reference numeral 60 in FIG. 2 to the exposed page 9 and at an oblique angle (90-θ) (where θ is in degrees and is not equal to zero) relative to the fast scan direction 13. Light reflecting directly off of exposed page 9 from light source 28 is incident on full rate mirror 16 at the point indicated generally by reference numeral 78 in FIG. 2 (for clarity see FIG. 6 which is described below).

Light diffusely reflected off of exposed page 9 from light source 28 is optical profile information that is recorded by the scanning system 4 to provide profile data for a scan line having a location along the slow scan direction 12. The optical profile information is directed by full rate mirror 16 along a path indicated generally by reference numeral 32. Focal optics 34 focus the optical profile information 32 onto a photosensor 36 which converts the optical profile information into electrical profile data. The photosensor 36 can be a CCD or any suitable alternative photosensor. In accordance with the present invention, optical profile information 32 and optical image information 20 are simultaneously recorded by photosensors 36 and 24, respectively, during a single scan pass. In order that photosensors 36 and 24 discriminate between light diffusely reflected from bound document 3, the two light sources 10 and 28 emit light having different wavelengths. In one embodiment, light source 10 emits green light, and light source 28 emits red light. A filter 38 is positioned in from of light source 14 to absorb all but green light. The filter 38 insures that only green light from light source 10 reaches photosensor 24. In addition, a filter 40, positioned in front of light source 28, filters out all but red light from photosensor 36. It will be understood by those skilled in the art that light sources 10 and 28 are not limited to emitting green and red light, and that for the purposes of the present invention any two wavelengths that are distinguishable will do, such as infrared light and visible light.

Figure 3:
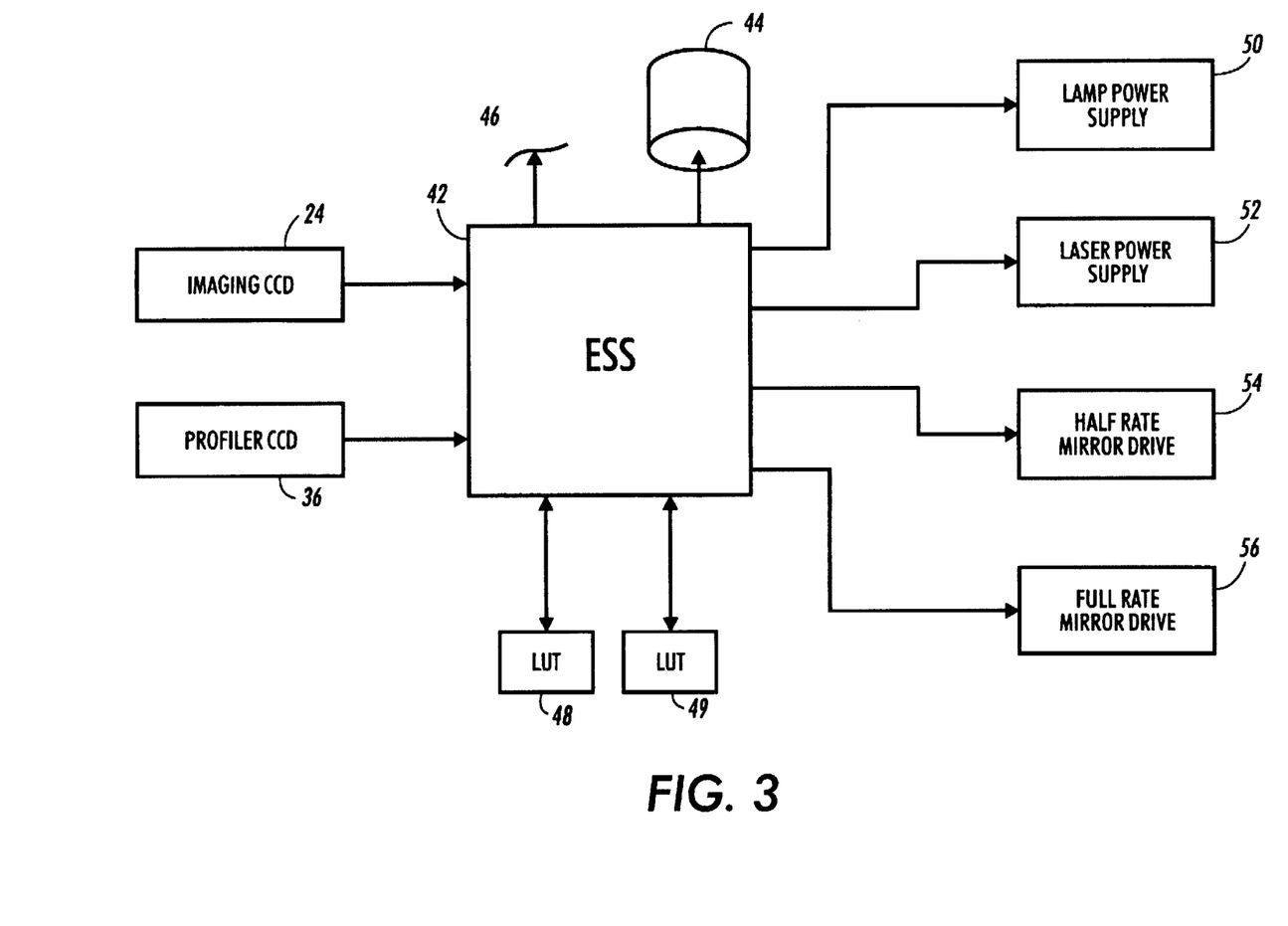
FIG. 3 is a block diagram of the control architecture of the scanning system shown in FIGS. 1 and 2.

FIG. 3 is a block diagram of the control architecture of the scanning system shown in FIGS. 1 and 2. An electronic subsystem (ESS) 42 controls the operation of scanning system 4. During a scan pass electrical image and profile data output by imaging CCD 24 and profiler CCD 36, respectively, is transmitted to ESS 42 for processing. ESS 42 includes a microprocessor and control software responsive to user or system commands for the processing and routing of electrical image and profile data. Electrical image and profile data transmitted to ESS 42 is stored in memory 44 which may include RAM, flash memory, floppy disk, or another form of optical or magnetic storage. At ESS 42, digital image data stored in memory 44 may either undergo image processing or may be transmitted to a peripheral device through port 46. The peripheral device may be an electronic printing system that provides hardcopy reproductions of recorded electrical image data. Alternatively, the peripheral device may be a storage device or a display. Using transmitted profile data and information in lookup tables (LUT) 48 and 49, ESS 42 calculates a displacement value ΔT between the exposed page 9 and a planar original image for a scan line having a location along the slow scan direction 12, the details of which are set forth below. With the calculated displacement value Δz, ESS 42 adjusts in one embodiment, imaging components to compensate for image distortion that occurs when exposed page 9 is displaced from the reference image plane of scanning system 4. Imaging components that are adjusted by ESS 42 to compensate for image distortion include the power supply 50 of light source 10 (i.e. lamp power supply), the half-rate drive 54 of corner mirror assembly 26, and the full rate drive 56 of assembly 18. In an alternate embodiment, correction factors for a scan line of image data can be derived by ESS 42 using displacement value Δz. These correction factors can then be applied to image data using well known image processing techniques that compensate for loss of focus, image compression, and uneven illumination. In both embodiments, ESS 42 controls power supply 52 of light source 28 to insure that diffusely reflected profile data 32 is accurately sensed by profiler CCD 36.

Figure 4:
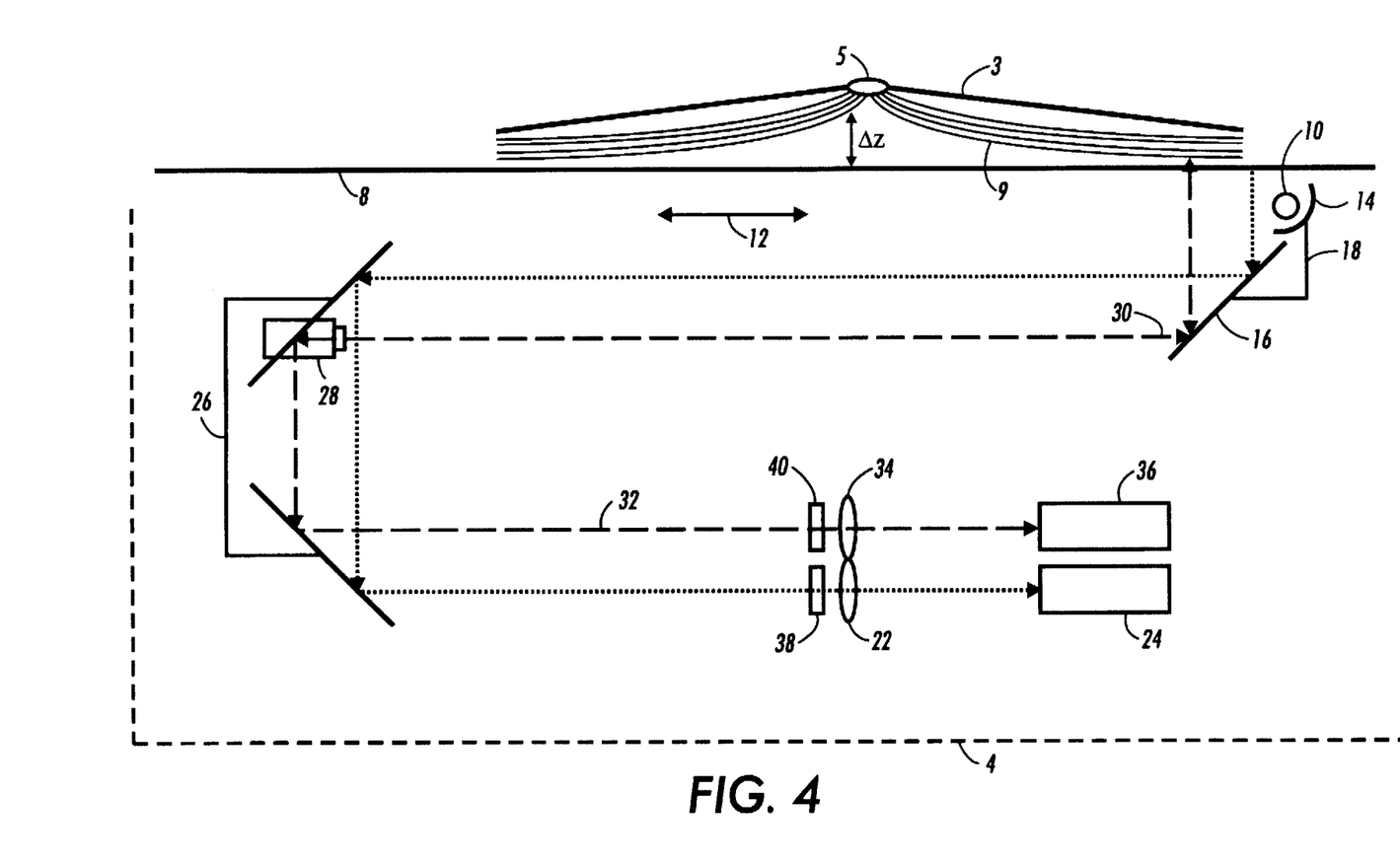
FIGS. 4 and 5 illustrate the full rate mirror nearing the spine region of the bound document in the scanning system shown in FIGS. 1 and 2, respectively.
Figure 5:
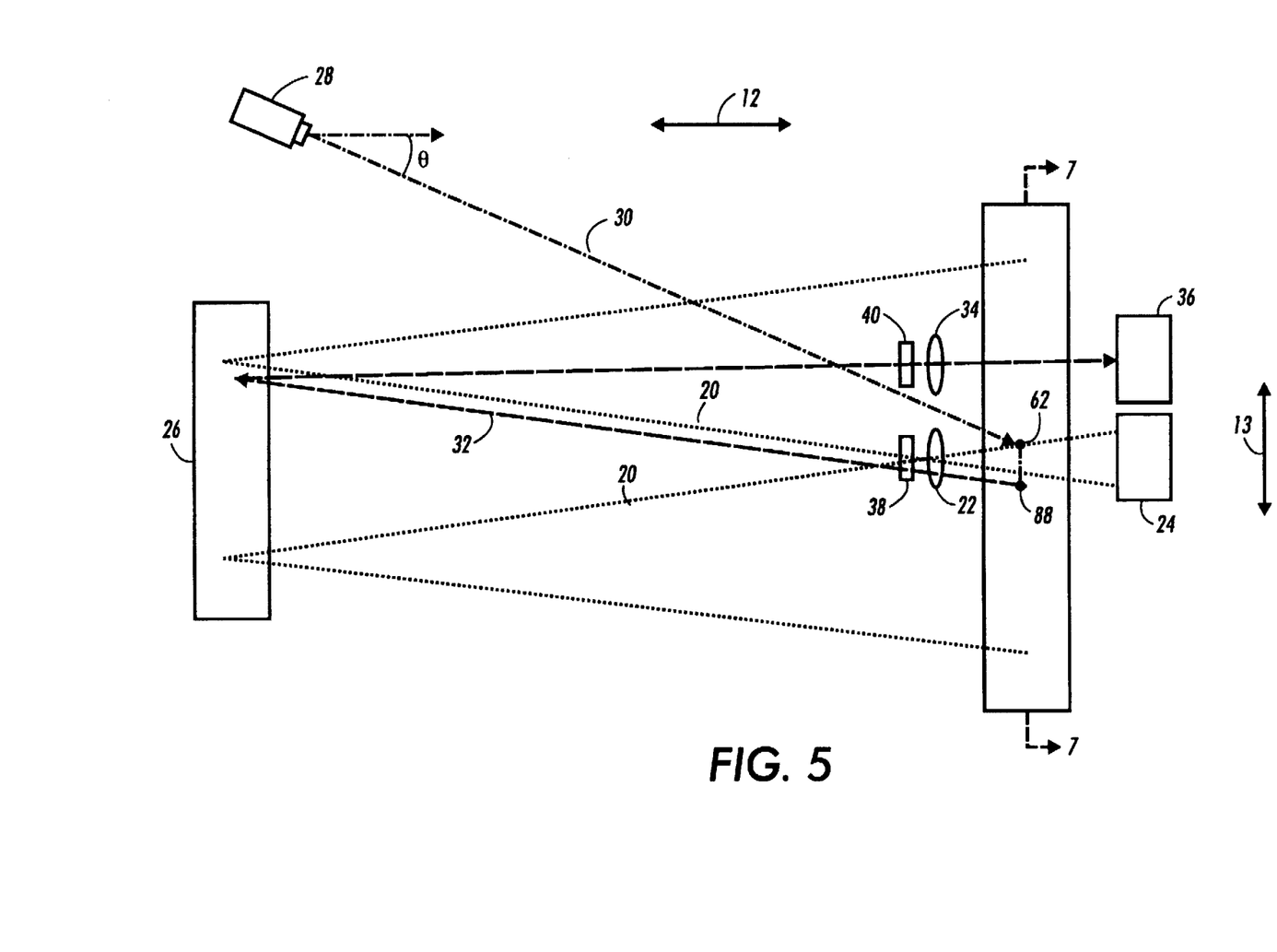

FIGS. 4 and 5 illustrate the scanning system 4 partly through an operation cycle. In contrast, FIGS. 1 and 2 illustrate the scanning system 4 at the start of an operation cycle. The full rate scanning mirror 16 is nearer the spine 5 of the bound document 3 in FIGS. 4 and 5 relative to the position the mirror 16 shown in FIGS. 1 and 2. In accordance with the invention, the collimated beam 30 strikes the full rate mirror 16 at a position indicated generally by reference numeral 60 in FIGS. 1 and 2. In FIGS. 4 and 5, the collimated beam 30 strikes the full rate mirror 16 at a position indicated generally by reference numeral 62. The position 62, at which the collimated beam 30 strikes the full rate mirror 16, traverses the fast scan direction 13 as the beam intersects the plane of the mirror 16 moving in the slow scan direction 12. This traversal along the fast scan direction 13 occurs because the light source 28 projects the collimated beam 30 at an angle θ relative to the slow scan direction 12. Specifically, as the full rate mirror 16 moves from right to left in the slow scan direction 12, as shown in FIGS. 1 and 4, the position at which the collimated beam strikes the mirror 16 traverses from bottom to top in the fast scan direction 13, as shown in FIGS. 2 and 5.

Figure 6:
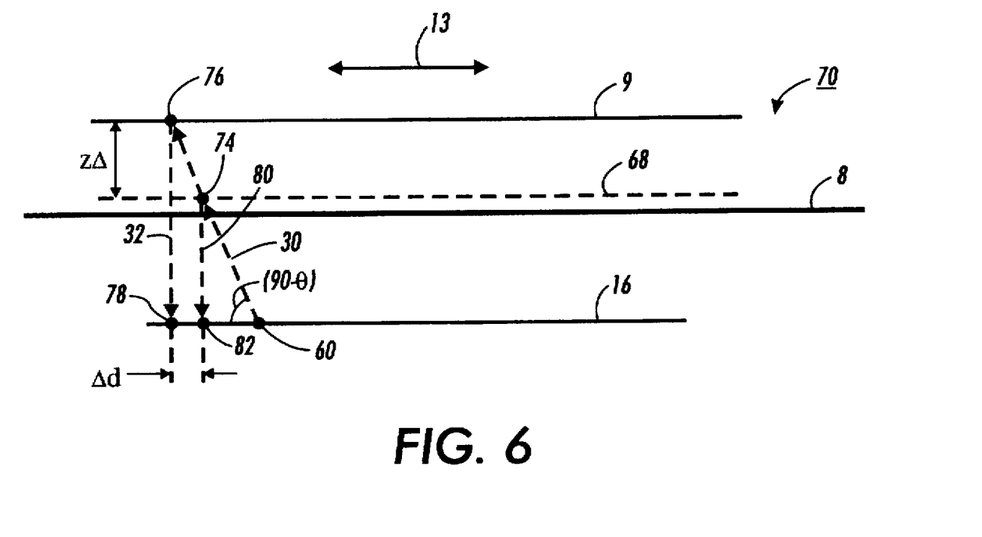
FIG. 6 is a cross-sectional view of FIG. 2 as viewed along the line 6—6 thereof.
Figure 7:
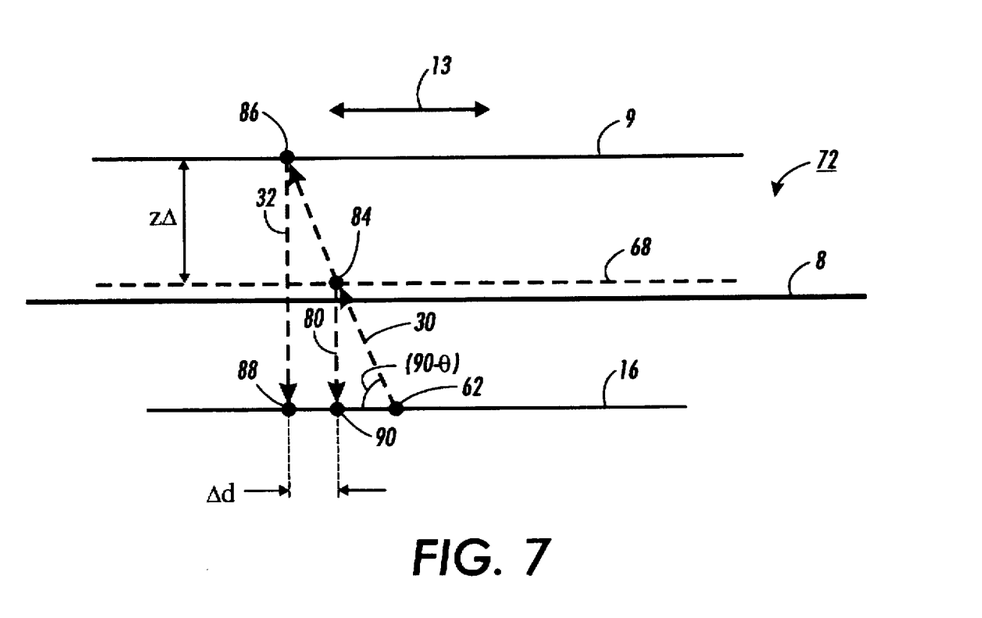
FIG. 7 is a cross-sectional view of FIG. 5 as viewed along the line 7—7 thereof.

FIGS. 6 and 7 are cross-sectional views along the lines 6—6 and 7—7 shown in FIGS. 2 and 5, respectively. The cross-sections shown in FIGS. 6 and 7 illustrate the manner in which the displacement Δz between non-planar exposed page 9 and a reference image plane 68 of the scanning system, which is represented by dotted line 68, is measured for two scan lines which are indicated generally by reference numerals 70 and 72, respectively. The reference image plane 68, in FIGS. 6 and 7, represents the position of a planar image on the platen 8 where optical information reflected therefrom is not distorted. The displacement Δz between non-planar exposed page 9 and the reference image plane 68 for each scan line 70 and 72 is determined by first locating reflections 32 recorded in profile data to identify a first location along the fast scan direction 13 at a location along the slow scan direction 12. Using prerecorded profile data for a planar image a second position is determined where the collimated beam 30 intersects the reference image plane 68 along the fast scan direction at the location along the slow scan direction 12. The difference between the first location and the second location is used to calculate the displacement Δz.

Referring now to FIG. 6 which illustrates the scan line 70 in detail, collimated beam 30 reflects off of full rate mirror 16 at position 60 toward original image 7. In accordance with the invention, the collimated beam 30 is directed at exposed page 9 at an angle that is oblique to the fast scan direction 13. More specifically, reflected collimated beam 30 travels toward exposed page 9 at an angle (90-θ) relative to the fast scan direction 13, where θ does not equal zero. Initially the reflected collimated beam 30 travels through transparent platen 8 before crossing reference image plane 68, at a position indicated by reference numeral 74, and striking non-planar original image 7, at a position indicated by reference numeral 76. Diffuse reflection off of original image 7, traveling along a path indicated by reference numeral 32, strikes full rate mirror 16 at a position indicated by reference numeral 78. If light reflected off of a planar image positioned along reference image plane 68, then light would travel along a path indicated by reference numeral 80 and strike full rate mirror 16 at a position indicated by reference numeral 82. The distance between the positions indicated by reference numerals 78 and 82 defines a distance Δd, which is used to determine the displacement Δz for a scan line having a position along the slow scan direction. In accordance with the invention, the displacement Δz is proportional to the distance between the position 74 at which the collimated beam 30 strikes a planar image positioned along reference image plane 68 and the non-planar exposed page 9 along the fast scan direction 13. Specifically, the displacement Δz is given by the equation Δz=Δd*TAN (90-θ), where θ is given in degrees.

Referring now to FIG. 7 which illustrates the scan line 72 in detail, collimated beam 30 is reflected off of full rate mirror 16 at position 62 toward original image 7. As noted above, the full rate mirror 16 in FIG. 7 is closer to the spine 5 of bound document 3 than in FIG. 6. Consequently, the distance Δd in FIG. 7 is larger because the displacement Δz increased proportionately. In addition, FIG. 7 illustrates that the position at which collimated beam 30 is reflected off of full rate mirror 16 towards original image 9 has moved along the fast scan direction to position 62 relative to position 60 shown in FIG. 6. Initially in FIG. 7, the reflected collimated beam 30 travels through transparent platen 8 before crossing reference image plane 68, at a position indicated by reference numeral 84, and striking non-planar original image 7, at a position indicated by reference numeral 86. Diffuse reflection off of exposed page 9 traveling along a path indicated by reference numeral 32 strikes full rate mirror 16 at a position indicated by reference numeral 88. If light reflected off of a planar image positioned along reference image plane 68, then light would travel along a path indicated by reference numeral 80 and strike full rate mirror 16 at a position indicated by reference numeral 90. The distance between positions 88 and 90 define distance Δd which is used to compute a second value of the displacement Δz along the slow scan direction of scanning system 4.

Figure 8:
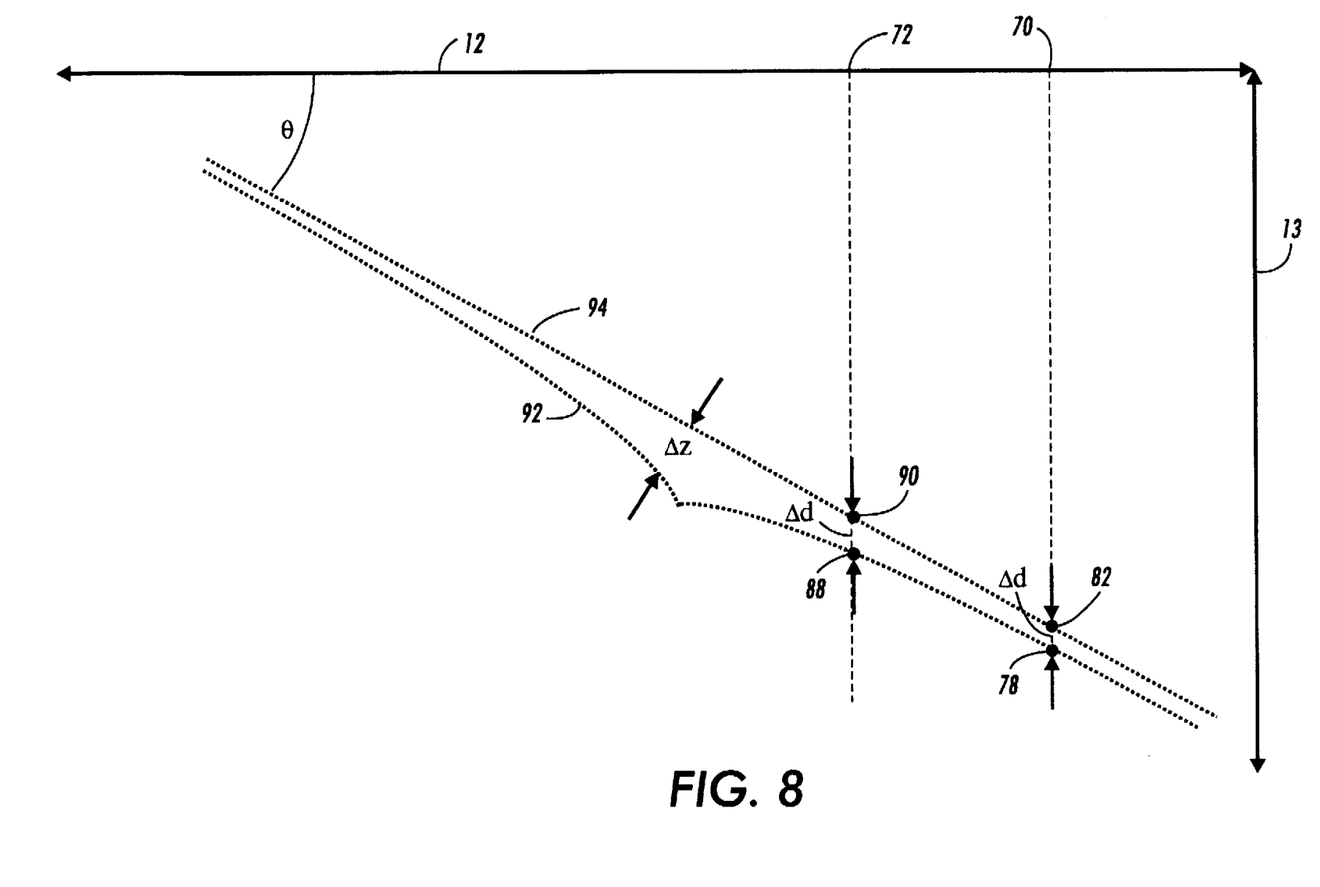
FIG. 8 illustrates a graph of output as viewed along a fast scan direction and a slow scan direction.

FIG. 8 is a graph that illustrates output from profiler CCD 36 for each scan line along the scan path of system 4 (i.e. slow scan direction 12). The output from profiler CCD 36 is a spot or area of light detected along a scan line of the profiler CCD 36 in the fast scan direction 13. By plotting the position of detected light from profiler CCD 36 for each scan line along its fast scan direction 13, a height profile is defined over the scan path in the slow scan direction 12. A first height profile 92, shown in FIG. 8, defines a profile for the non-planar original image 7. For example, positions 78 and 88 along scan lines 70 and 72, respectively, are areas where light reflected off of non-planar exposed page 9 from collimated light source 28 was detected by profiler CCD 36. During calibration of the scanning system 4, a second or reference height profile 94 for a planar image, which is positioned along reference image plane 68, is measured using profiler CCD 36. For example, positions 82 and 90 are areas along scan lines 70 and 72, respectively, where light from collimated light source 28 is detected by profiler CCD 36 for the planar image positioned along reference image plane 68. Once recorded, the second height profile 94 is stored in LUT 48 (shown in FIG. 3) for later retrieval when calculating distance Δd for a scan line since height profile 94 is the zero reference point for height profile calculations. Accordingly, image data recorded by imaging CCD 24 at a position equivalent to height profile 94 along the fast scan direction 13 for a corresponding scan line positioned along the slow scan direction 12 should not require corrections for image distortion by ESS 42.

Figure 9:
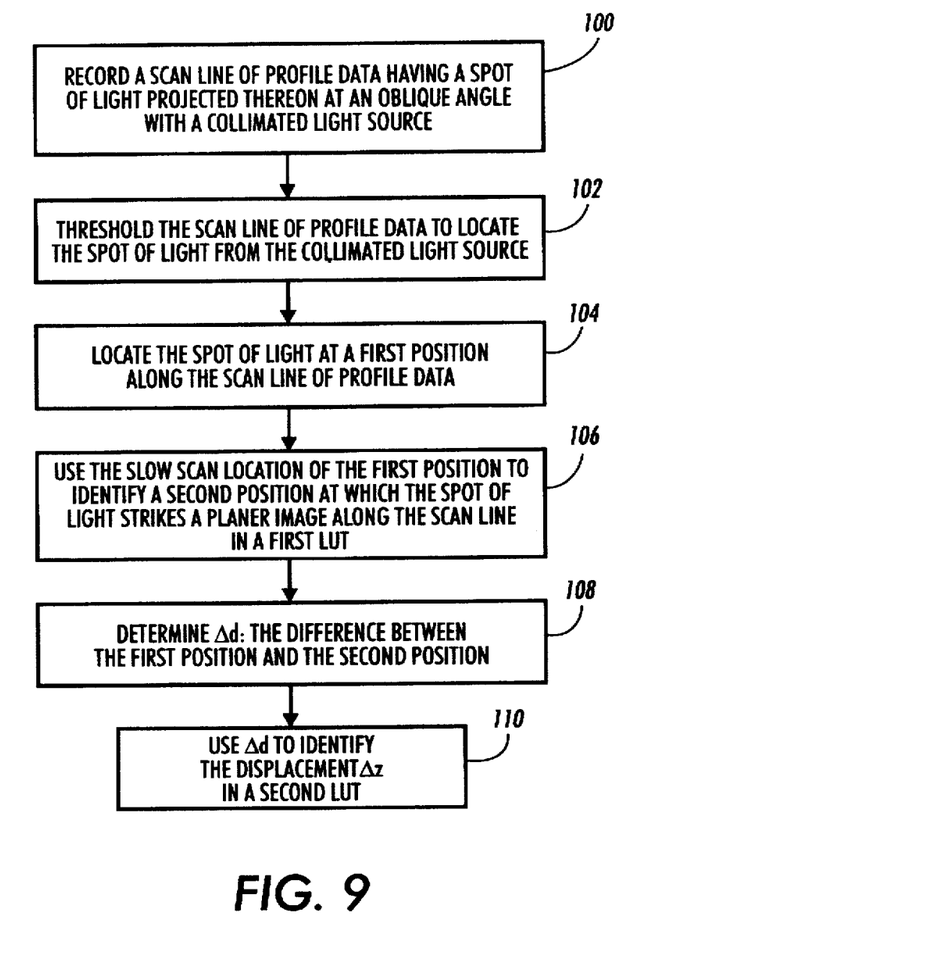
FIG. 9 is a flow diagram of the steps required to determine displacement $\Delta z$ for a scan line.

FIG. 9 is a flow diagram of the steps performed by ESS 42 to determine displacement Δz for a scan line. At step 100, a scan line of profile data is recorded using profiler CCD 36. The scan line of profile data which is defined at a location along the slow scan direction 12 contains a spot of light, which was projected onto the original image by collimated light source 28 at an oblique angle. At step 102, the scan line of profile data is thresholded to identify the spot of diffusely reflected light from the collimated light source 28. At step 104, the spot of diffusely reflected light is identified at a first pixel position. The first pixel position identifies a pixel along the profiler CCD 36 at the defined location along the slow scan direction 12. For example, the first pixel position identified for spot of light 78 in FIG. 8 is different from the first pixel position identified for the spot of light 88 at scan line 70 (i.e. the defined location along the slow scan direction 12). If a cluster of pixels defines an area of diffusely reflected light, the centroid of the cluster of pixels is used to define the first pixel position along the profiler CCD 36.

At step 106, a second pixel position is identified using a first lookup table (LUT) 48. The second pixel position defines a pixel along profiler CCD 36 at a predefined location along the slow scan direction 12 for a planar image positioned along reference image plane 68 shown in FIG. 8. More specifically, each second pixel position in LUT 48 identifies a pixel position along the fast scan direction 13 for the spot of light projected by collimated light source 28 at a location along the slow scan direction of a planar (or flat) image. Each of the second pixel locations in LUT 48 are indexed by the location of the full rate mirror 16 along the slow scan direction 12. For example, scan line 70 in FIG. 8 has a defined location along the slow scan direction 12 which is used to identify the second pixel position 82. The difference between the first pixel position and the second pixel position is determined at step 108 (e.g. the difference between the first position 78 and the second position 82 in FIG. 8). This difference defines the distance Δd shown in FIG. 8. At step 110, the difference between the first and second pixel positions (i.e. Δd), and the angle θ at which the collimated beam 30 is directed, are used to identify the displacement Δz in a second LUT 49. The difference value between a first pixel position and a second pixel position (i.e. Δd) are used to index values in the second LUT 49 for the displacement Δz given by the equation Δz=Δd*TAN (90-θ). The value for a scan line of the displacement Δz is then used by ESS 42 to adjust imaging components of system 4 to compensate for image distortion occurring when exposed page 9 is displaced from the reference image plane of scanning system 4. Once a displacement Δz is calculated for each scan line along the slow scan direction of bound document 3 a height profile similar to profile 92 shown in FIG. 8 is defined.

In order to record image data and profile data in a single pass, profiler CCD 36 is positioned to record profile data a number of scan line in advance of imaging CCD 24. The offset between the two sensors is advantageous because it minimizes or eliminates the need to buffer scan lines so that there is sufficient time to calculate the displacement Δz before the scanning system requires it. The rate at which ESS 42 can determine the displacement Δz and make corrections to compensate for the displacement defines the number of scan line the profile CCD 36 must scan in advance of the imaging CCD 24. In one embodiment, ESS 42 compensates for the displacement Δz by adjusting individual system components. For example, ESS 42 can adjust lamp power supply 50 for loss of illumination as the displacement Δz increases. Image spacing can be compensated in this embodiment by monitoring the speed of the half rate mirror drive 54 and the full rate mirror drive 56. In addition, loss of focus can be compensated by adjusting the focus of the optical arrangement 24. In another embodiment, ESS 42 can compensate for the displacement Δz by correcting image data from imaging CCD 24 with well known image processing techniques that include methods for correcting image positioning, focus, compression, and illumination. Examples of these image processing techniques are disclosed in U.S. Pat. No. 5,276,530 to Siegel, which is incorporated herein by reference. It will be understood by those skilled in the art that the profiler CCD 36 and imaging CCD 24 can record profile data and image data off of the same scan line in a scanning system that does not correct image data in real time. For example, profile data can be recorded and used to correct image data at the time it is reproduced as hard copy by an electronic printing system.

It will be appreciated by those skilled in the art that the present invention can be readily used to measure the height profile of a non-planar original image in a one pass or in a two pass scanning system. It will also be understood that in a two pass system, the filters 38 and 40 are not required to discriminate between two different sources of light 10 and 28 since light source 28 is only turned on during the first pass and light source 14 is only turned on during the second pass.

In addition, only a single CCD sensor is required in a two pass system since profile data for a document is recorded during a first pass and image data is recorded during a second pass. Although a one pass scanning system has the advantage of increased processing speeds because it can simultaneously record image data and profile data, a two pass scanning system has other advantages. One advantage of a two pass scanning system is that the spine region 5 of the bound document 3 can be identified before recording image data during the second pass. By measuring the height profile of a bound document before recording image data, scanning system 4 can offer job level programming. Job level programming can include input programming options for specifying whether to scan one or both sides of a bound document. Examples of such programming options are described in U.S. Pat. No. 5,119,206 by Rourke et al., the pertinent portions of which are incorporated herein by reference. Accordingly, depending on the particular requirements of a scanning system (e.g. processing speed or job level programming), the present invention can be used to measure the height profile of a bound document in a one or a two pass scanning system.

Figure 10:
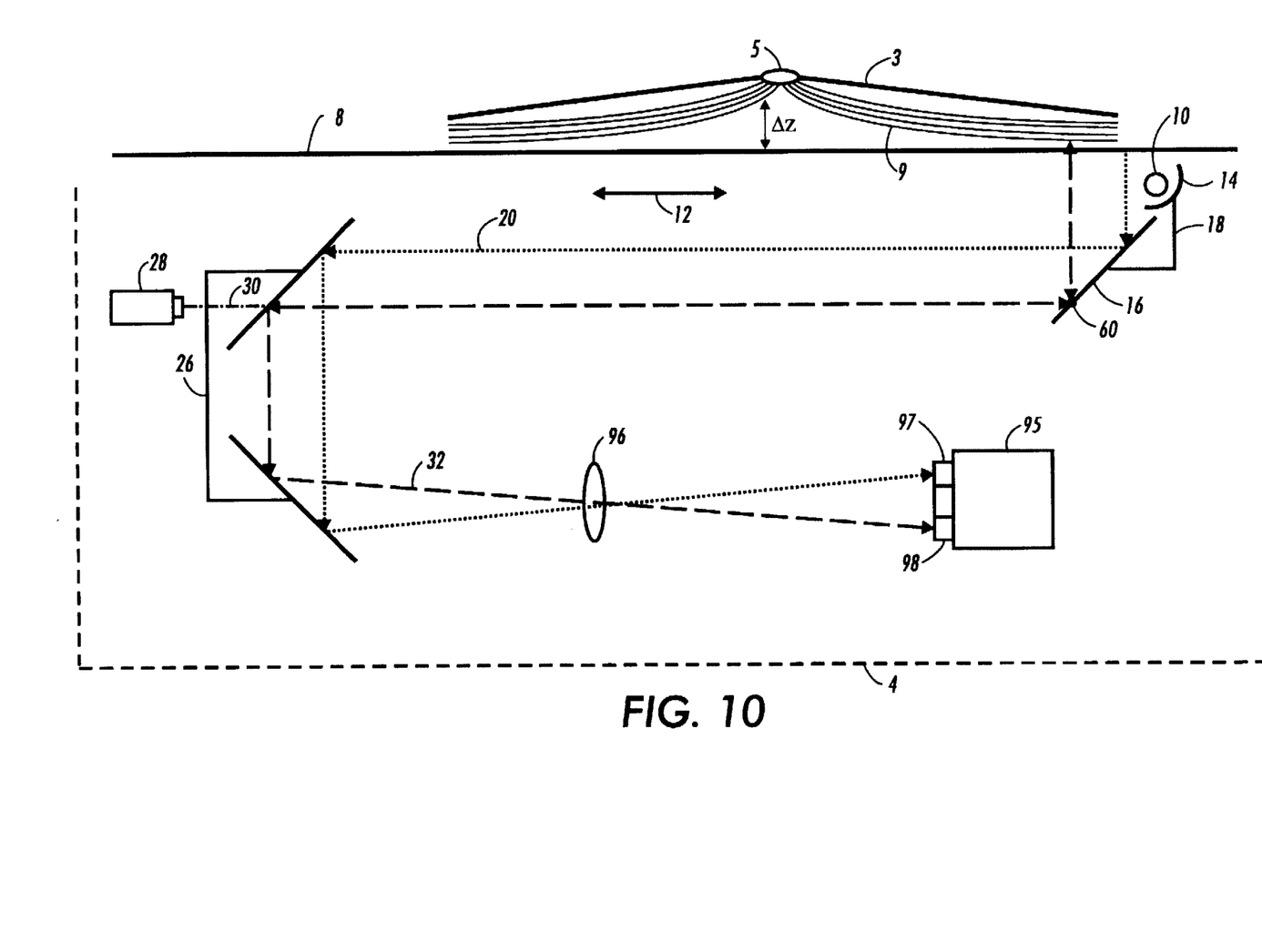
FIG. 10 is an alternate embodiment of the scanning system shown in FIG. 1 in which one channel of a color scan bar is used to record image data and a second channel of the color scan bar is used to record profile data.

FIG. 10 shows an alternate embodiment of the scanning system shown in FIG. 1, in which a known color scan bar 95 with focal optics 96 records both image data and profile data on independent color channels of the color scan bar 95. Specifically, the image data and the profile data are recorded during a single scan pass with a first color channel 97 and a second color channel 98, respectively, of the color scan bar 95. The first color channel 97 of the color scan bar 95 detects diffusely reflected optical profile information 32. The second color channel 98 of the color scan bar 95 detects diffusely reflected optical image information 20. It will be understood by those skilled in the art that in conventional mode, light source 10 emits white light and all three channels of the color scan bar 95 record optical image data.

When operating as a two pass scanning system, the scanning system 4 shown in FIG. 10 would operate by performing a first scan with the light source 10 OFF and the collimated laser beam 28 ON. The laser 28, which is positioned to the side of a centrally located color scan bar 95 and optical assembly 96, illuminates a spot on the exposed page 9 with full rate mirror 16. The beam 30 from laser 28 is aligned at an oblique angle to the slow scan direction of the scanning system 4 (as described above). For a planar image, the laser beam defines a height profile that is uniform. However, when a non-planar original image is scanned, the laser beam defines a height profile that is contoured and displaced in relation to the height profile of the planar image. Once the first scan is completed and the profile data is accumulated, a second scan is performed with the light source 10 ON and the collimated beam 28 OFF. The ESS uses data from the height profile to correct distortions in recorded color image data recorded with the color sensor 98 during the second pass.

Figure 11:
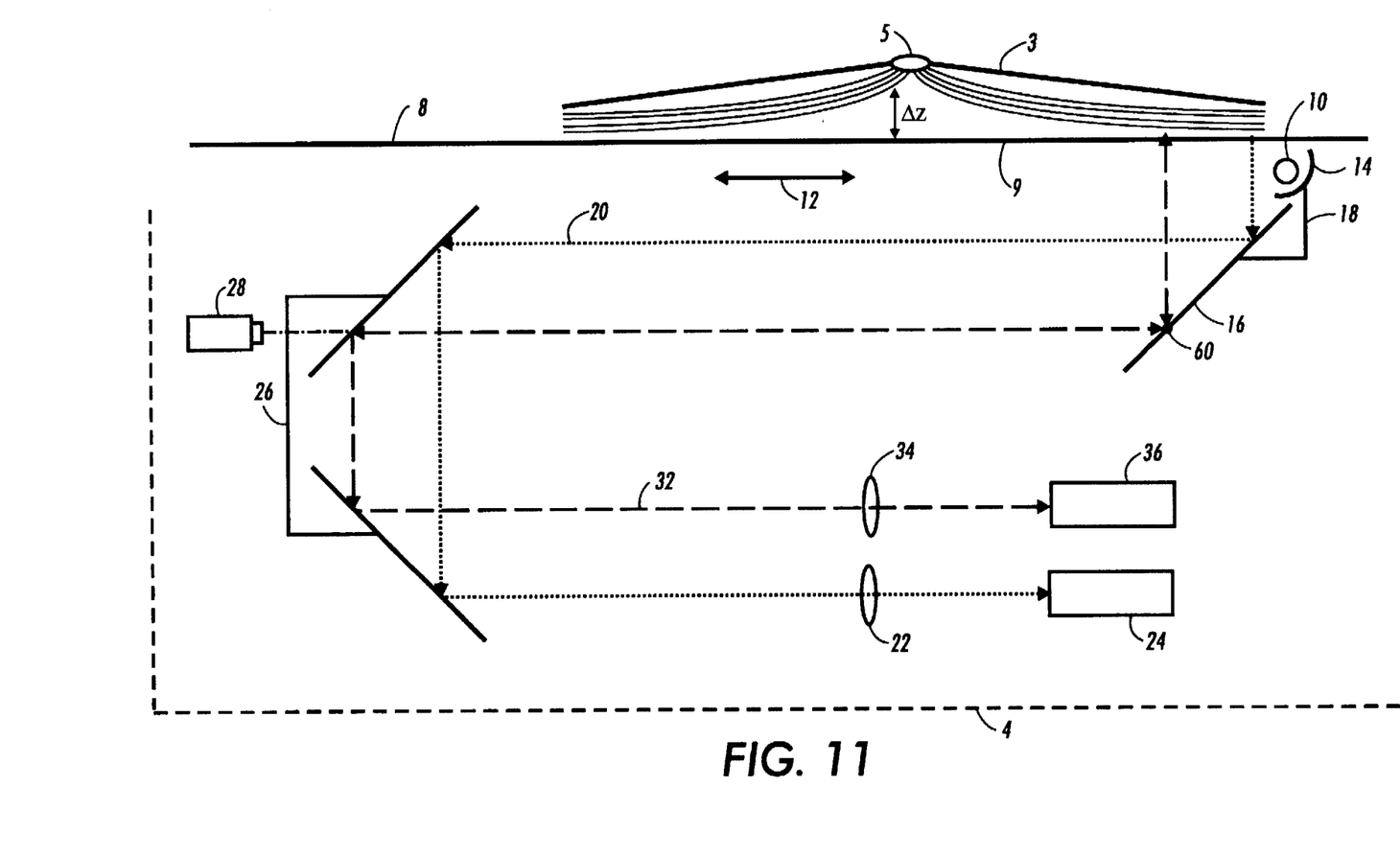
FIG. 11 is another alternate embodiment of the scanning system shown in FIG. 1 in which the beam projected by the collimated light source is spaced sufficiently from the light source mounted on a full rate drive assembly so that the profiler CCD and the imaging CCD do not need filters to discriminate between the two light sources.

FIG. 11 shows another alternate embodiment of the scanning system shown in FIG. 1 in which profiler CCD 36 records profile data a sufficient number scan lines in advance of imaging CCD 24 so that each CCD can discriminate between light reflected from source 10 and source 28 without filters 38 and 40. The embodiment shown in FIG. 11 has a slightly larger viewing area in the slow scan dimension 13 than the embodiment shown in FIG. 1. This increased viewing area is provided by increasing the surface area on the full rate mirror 16 and the corner mirror assembly 26. The advantage of this embodiment is that light sources 10 or 28 do not have to emit a predefined wavelength of light.

Figure 12:
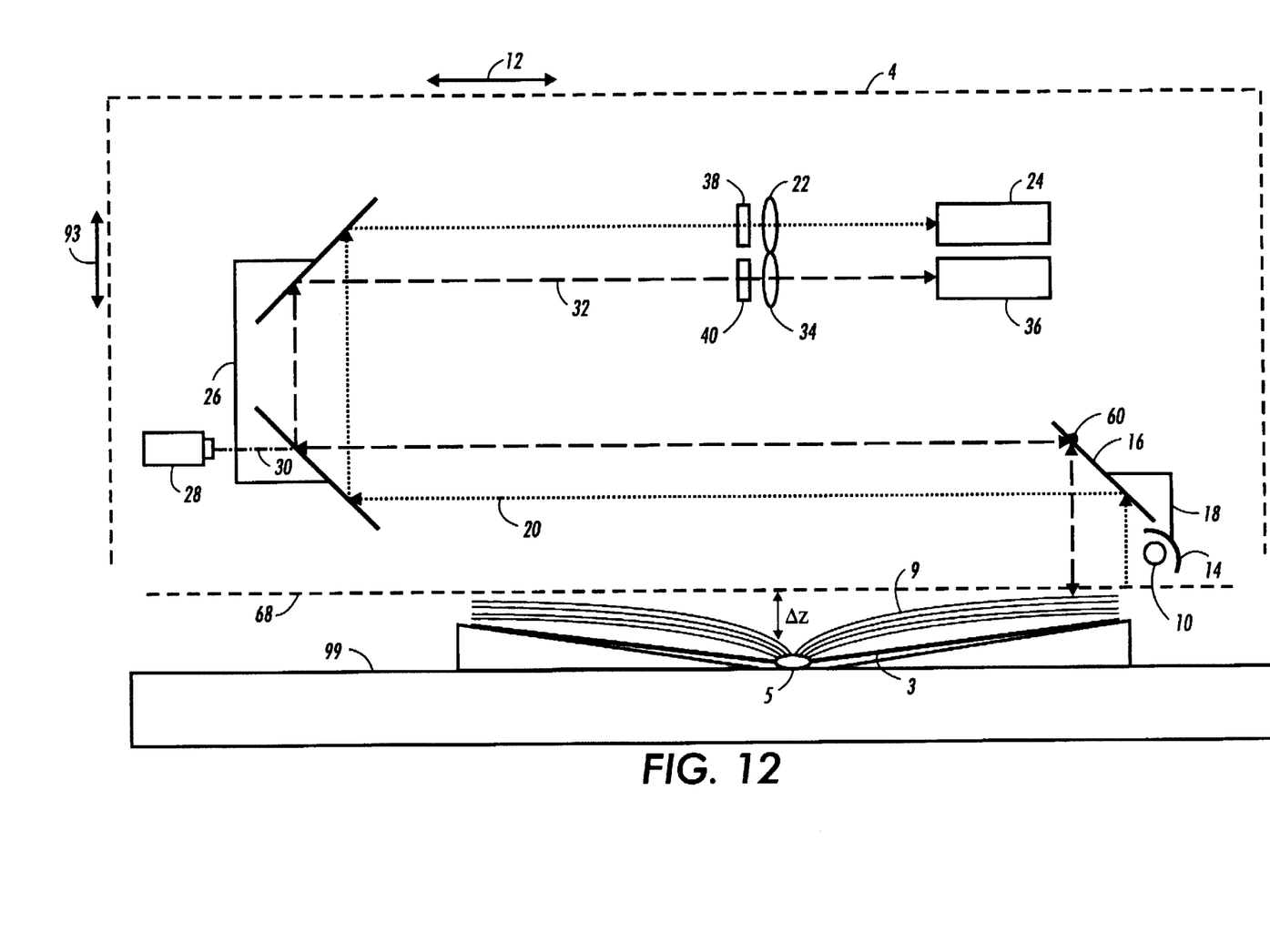
FIG. 12 is yet another alternate embodiment of the scanning system shown in FIG. 1 in which the scanning system is in an overhead position so that the bound document does not need to be repositioned after scanning each page.

FIG. 12 shows yet another embodiment where the scanning system 4 is located above a scanning platform 99. In this embodiment, the bound document 3 is positioned for scanning on scanning platform 99 in an open and upward facing condition. Scanning bound documents using the embodiment shown in FIG. 12 simplifies the amount of work an operator is required to perform for each scan. Generally, the overhead scanning system shown in FIG. 12 is operationally less time-consuming for an operator because the bound document 3 does not have to be repositioned after scanning each page unlike the scanning system shown in FIG. 1. Instead, the scanning system 4 in this embodiment is raised and lowered relative to platform 99, as indicated generally by arrow 93, so that pages can be turned between scanning operations. Also, it will be appreciated that scanning system 4 can be modified to incorporate functions of a system that automatically turns pages of a bound document. Examples of systems for turning pages of bound documents are disclosed by Turner et al. in U.S. patent application Ser. No. 08/570,880 entitled "Bound Document Imager with Page Turner," and U.S. patent application Ser. No. 08/570, 791 entitled "Bound Document Imager with Air Jet Page Turning System," both fried on Dec. 12, 1995 and assigned to the same assignee as the present invention.

In a further embodiment of the present invention (not shown), the collimated light source 28 is mounted on the full-rate drive assembly 18. In accordance with the invention, the light source 28 is mounted so that the collimated beam 30 is projected at an oblique angle relative to the fast scan direction. However, in this embodiment, since the collimated light source 30 is mounted onto the light source 28, the collimated beam 30 does not move in the fast scan direction as the drive assembly 18 moves in the slow-scan direction. This causes the profile 94 shown in FIG. 8 to be a horizontal line along the slow scan direction 12. The position where the collimated beam 30 intersects the reference image plane 68 along the fast scan direction is therefore a constant in this embodiment. Consequently, the LUT 48 can be substituted with a buffer for storing the constant.

In summary, the present invention is a method and apparatus for accurately determining a height profile of a non-planar original image. The height profile indicates the distance the non-planar original image is displaced from the reference image plane of a scanning system. After determining the height profile, adjustments can be made to the scanning system elements or the recorded image data to correct distortions caused when recording the non-planar original image. The height profile is determined by projecting a collimated beam of light on the original image at a position along the fast scan direction of the scanning system. In accordance with one aspect of the invention, the collimated beam is directed to strike the original image at an oblique angle. The diffuse reflection of the position is recorded by a profile sensor to provide a relative position along the fast scan direction of the original image. The position recorded by the profile sensor is compared with data in a lookup table. The data in the lookup table defines the position the collimated beam would have been detected by the profile sensor if the original image was not displaced from the reference image plane of the scanning system. The difference between these two positions is used to define the displacement of the original image from the reference image plane for a scan line along the slow scan path of the scanning system.

It will be appreciated by those skilled in the art that the position of the profiler CCD 36 and the imaging CCD 24 do not have to be staggered diagonally as shown in the FIGS. (compare CCDs 24 and 36 in FIGS. 1 and 2) and that the two sensors 24 and 36 can be positioned next to or on top of each other depending on the configuration requirements of a particular scanning system. In addition, it will be appreciated that profiler CCD 36 can be substituted with a position sensitive detector that would be used to carry out the present invention by calculating a moment along a scan line for a spot of light projected thereon. The moment would subsequently be used to identify a location along the scan line of the spot of light. An example of a position sensitive detector is disclosed by Petersson et al. in "Position Sensitive Light Detectors with High Linearity", IEEE Journal of Solid-State Circuits, Vol. SC-13, No. 3, June 1978, the pertinent portions of which are incorporated herein by reference. It will also be appreciated that the collimated beam projector 28 can positioned so that beam 30 is projected at an angle that is not parallel to the reference image plane as shown in the Figures.

It will be further appreciated by those skilled in the art that the full rate and half-rate mirror assemblies can be substituted with a single scanning unit that traverses the slow scan direction. It will also be appreciated that the present invention is not limited to a one-dimensional scanning system and can alternatively be a two-dimensional flat panel detector or a two-dimensional charge coupled device (CCDs). An example of a flat panel detector is disclosed in U.S. Pat. No. 5,017,989. Additionally, it will be appreciated that in such a two-dimensional scanning system, the collimated light source would project a beam across the slow scan direction of the scanning system and not at a single scan line. It will additionally be appreciated by those skilled in the art that LUT 48 and LUT 49 can be substituted with a single two-dimensional LUT. Alternatively, LUT 49 can be eliminated by computing a value in the LUT on demand as an entry is required.

Various aspects of the disclosed scanning system may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. A method for determining a displacement of an original image from a reference image plane of a scanning system having a fast scan and a slow scan direction, comprising the steps of:

projecting a spot of light at an oblique angle onto a scan line of the original image, the scan line being aligned along the fast scan direction and having a location along the slow scan direction;

recording optical information reflected from the scan line to provide profile data for the scan line;

evaluating the profile data to identify a first position where the spot of light is located on the original image along the fast scan direction in the reference image plane; identifying a second position representing where the spot of light intersects the reference image plane along the fast scan direction; and calculating the difference between the first position and the second position to determine the displacement of the original image from the reference image plane of the scanning system at the location along the slow scan direction.

2. The method according to claim 1, wherein said projecting step projects the spot of light onto a full rate mirror assembly.

3. The method according to claim 2, wherein the spot of light traverses the fast scan direction as the full rate mirror assembly moves in the slow scan direction.

4. The method according to claim 1, further comprising the steps of:

projecting the spot of light onto a planar image coincident with the reference image plane; and recording in a lookup table positions where the spot of light is located along the fast scan direction at positions along the slow scan direction.

5. The method according to claim 4, wherein said identifying step identifies the second position from the lookup table.

6. The method according to claim 1, wherein said calculating step determines the difference between the first position and the second position from a lookup table.

7. The method according to claim 1, further comprising the step of providing a lookup table for recording displacements of images from the reference image plane that correspond to differences between the first position and the second position.

8. The method according to claim 7, further comprising the step of querying the lookup table with the difference between the first position and the second position to identify the displacement of the original image from the reference image plane of the scanning system at the location along the slow scan direction.

9. The method according to claim 1, further comprising the steps of:

recording optical information reflected from a scan line at said location along the slow scan direction to provide a scan line of image data; and correcting the scan line of image data in accordance with the displacement determined by the calculating step.

10. The method according to claim 1, wherein said projecting step projects the spot of light with light having a first wavelength.

11. The method according to claim 10, further comprising the step of:

illuminating the original image with light having a second wavelength; and filtering the second wavelength of light from the first wavelength of light before recording optical information.

12. An apparatus for determining a displacement of an original image from an reference image plane of a scanning system, comprising:

a first light source for projecting a spot of light at an oblique angle onto the original image;

a first photosensor for recording optical information reflected from a scan line of the original image along a fast scan direction to provide profile data of a scan line at a location along a slow scan direction of the scanning system;

means for evaluating the profile data to identify a first position where the spot of light is located on the original image along the fast scan direction in the reference image plane;

means for identifying a second position representing where the spot of light intersects the reference image plane along the fast scan direction; and an electronic subsystem for calculating the difference between the first position and the second position to determine the displacement of the original image from the reference image plane of the scanning system at the location along the slow scan direction.

13. The apparatus according to claim 12, further comprising a full rate mirror for directing optical data from the image to said first photosensor.

14. The apparatus according to claim 13, further comprising a drive assembly for moving said full rate mirror in the slow scan direction.

15. The apparatus according to claim 14, wherein the spot of light traverses the fast scan direction as the drive assembly moves in the slow scan direction.

16. The apparatus according to claim 12, further comprising a first lookup table for storing positions along the fast scan direction of the spot of light projected onto a planar image at locations along the slow scan direction.

17. The apparatus according to claim 16, further comprising a second lookup table for storing the difference between the first position and the second position that correspond to the displacement of the original image from the reference image plane at locations along the slow scan direction.

18. The apparatus according to claim 12, further comprising a second photosensor for recording a scan line of image data.

19. The apparatus according to claim 18, further comprising a second light source for illuminating the scan line of image data recorded by said second photosensor.

20. The apparatus according to claim 19, wherein said first light source emits light having a first wavelength and said second light source emits light having a second wavelength.

21. The apparatus according to claim 20, further comprising a first filter for filtering the second wavelength of light from the first photosensor.

22. The apparatus according to claim 20, further comprising a second filter for filtering the first wavelength of light from the second photosensor.

23. An apparatus for scanning an original image displaced a distance from an reference image plane, comprising:

a first light source for illuminating the original image along a fast scan direction;

a first sensor for recording image data illuminated by said first light source;

a second light source for directing a collimated beam at a location along the fast scan direction;

a drive assembly for moving the location of the collimated beam in a slow scan direction perpendicular to the fast scan direction;

a second sensor for converting light reflected off a scan line of the original image to profile data; and an electronic subsystem for determining the distance the original image is displaced from the reference image plane with the profile data to correct distortions in the image data.

* * * * *